United States Patent

Snyder

[15] 3,689,836
[45] Sept. 5, 1972

[54] MAGNETODIODE PULSE INITIATOR
[72] Inventor: Carl J. Snyder, Raleigh, N.C.
[73] Assignee: Westinghouse Electric Corporation, Pittsburgh, Pa.
[22] Filed: Oct. 8, 1970
[21] Appl. No.: 79,145

[52] U.S. Cl. .................................324/117 R, 324/46
[51] Int. Cl. .........................G01r 33/00, G01r 33/02
[58] Field of Search ..324/117 R, 117 H, 45, 46, 137, 324/142, 113, 174; 323/94 H; 338/32 R, 32 H; 340/271, 177 VA, 177 VX, 177 R

[56] References Cited

UNITED STATES PATENTS

| | | | |
|---|---|---|---|
| 3,162,804 | 12/1964 | Parsons | 324/45 X |
| 3,535,626 | 10/1970 | Uemura et al. | 324/46 |
| 3,127,594 | 3/1964 | Roe et al. | 324/137 X |
| 2,941,163 | 6/1960 | Hess, Jr. | 324/46 |
| 3,366,909 | 1/1968 | Hini et al. | 323/94 H |

FOREIGN PATENTS OR APPLICATIONS

| | | | |
|---|---|---|---|
| 1,194,925 | 6/1970 | Great Britain | 324/46 |

*Primary Examiner*—Rudolph V. Rolinec
*Assistant Examiner*—Ernest F. Karlsen
*Attorney*—A. T. Stratton, C. L. Freedman and Richard V. Westerhoff

[57] ABSTRACT

A pulse initiator for generating pulses at a rate proportional to the rate of rotation of a shaft includes a disc-shaped permanent magnet and a return plate axially displaced on the shaft for generating a magnetic field parallel to the shaft which alternates in polarity at any given point in the gap between the magnet and the return plate as the shaft rotates. A pair of magnetodiodes mounted in the air gap so that they are continuously exposed to magnetic fields of opposite polarity, alternately generate positive and negative output signals from a bridge circuit as the polarity of the magnetic field alternates. Two transistors operating in the switching mode gate either positive or negative half cycles of alternating current to a latching, mercury-wetted contact type relay depending upon the polarity of the output of the bridge circuit. A small AC bias current applied to the control circuits of the transistors assures positive operation with a moderate strength magnetic field.

6 Claims, 3 Drawing Figures

PATENTED SEP 5 1972    3,689,836

MAGNETODIODE PULSE INITIATOR

BACKGROUND OF THE INVENTION

1. Field of the Invention

This invention relates to pulse initiators for generating pulses at a rate proportional to the rotational movement of a shaft and more particularly to pulse initiators of this type for use in devices such as electric meters where it is important to minimize the loading of the pulse initiator on the shaft.

2. Prior Art

Since electric utility companies partially base their rates on the peak load that a customer puts on the generation and distribution system, demand meters have been developed which integrate the power consumed over a given time period, typically 15 minutes, and compare this running value with a standard. Often the demand meter is a part of a control system which sounds an alarm or sheds load if the trend indicates that the established quota for the measuring period will be exceeded.

It is common practice today to utilize demand meters which are pulse driven from a watt-hour meter. Typically, a pulse generator is coupled to the meter shaft. It is important to minimize the load imposed on the watt-hour meter by the pulse generator in order to maintain the accuracy of the meter.

Photoelectric pulse initiators in which light beams directed by reflective surfaces connected to the moving element of the meter trigger photoelectric cells are in widespread use. Although these devices have proved quite satisfactory, their reliability is dependent upon the life of the lamps utilized.

It has also been proposed that a Hall element be exposed to a rotating magnetic field generated by a permanent magnet connected to the moving element of the meter. The alternating polarity of the magnetic field impinging on the Hall element generates voltages of alternating polarity which when amplified by a differential amplifier may be utilized to actuate a bistable relay. A drawback of this arrangement is the limited sensitivity of the Hall generator which necessitates a high gain amplifier and a strong magnetic field. The strong magnetic field requires a larger magnet which increases the friction load on the meter.

SUMMARY OF THE INVENTION

According to this invention, magnetodiodes which are 10 to 100 times more sensitive to a magnetic field than a Hall generator are utilized to detect the rotating magnetic field. In order to increase the effectiveness of the magnetic field for any kind of magneto-responsive device, a return plate of magnetically permeable material is axially displaced on a shaft carrying a rotating disc magnet. In the preferred embodiment of the invention, two magnetodiodes are mounted in the gap thus formed so that they are oppositely affected by the rotating magnetic field. Thus a bridge circuit in which the magnetodiodes are connected is alternately unbalanced to produce first an output signal of one polarity and then the other as the disc magnet is rotated by the meter. In the embodiment of the invention described in detail, the disc magnet has two north and two south pole segments evenly spaced about the shaft and the two magnetodiodes are mounted 90° apart.

The output signals of the bridge circuit are applied to the control circuits of two electronic switches one of which is operative to gate positive half cycles of an alternating current source to a current responsive bistable device when the output of the bridge circuit is positive, while the other electronic switch is operative to gate negative half cycles of the current source to the bistable device in response to a negative output from the bridge circuit. A small alternating current bias on the alternating current source is applied to the control circuits of the electronic switch to assure positive operation with a moderate magnetic field.

BRIEF DESCRIPTION OF THE DRAWINGS

For a better understanding of the invention, reference may be had to the preferred embodiment, exemplary of the invention, shown in the accompanying drawing in which.

DESCRIPTION OF THE PREFERRED EMBODIMENT

Figure 1:
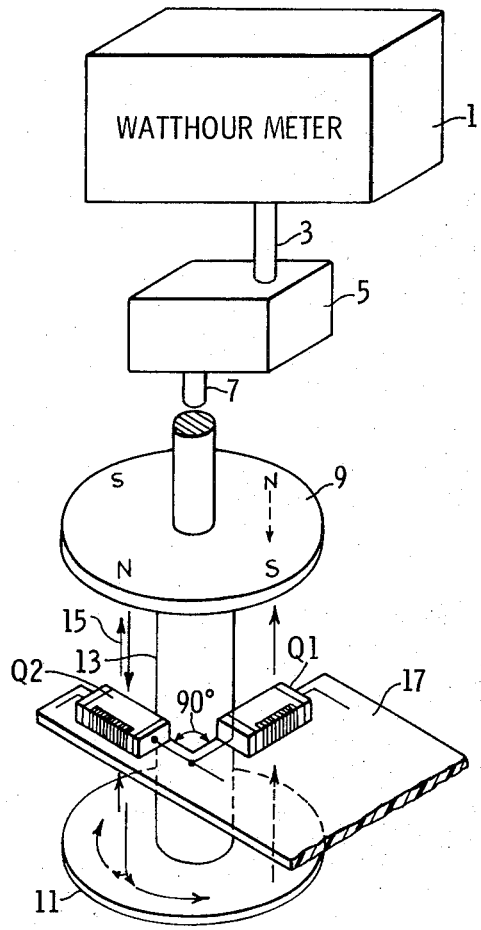
FIG. 1 is an isometric view with some parts shown symbolically and some parts shown enlarged of a pulse initiator according to this invention.

Referring to FIG. 1, a watt-hour meter 1 rotates a shaft 3 at a rate proportional to the rate of power consumption in an electrical circuit. The shaft 3 drives a shaft 7 at a reduced rate through a set of reducing gears 5. Connected to the shaft 7 is a permanent disc magnet having two north and two south pole segments located 90° apart. A return plate 11 is axially displaced on the shaft 7 from the disc magnet 9 by a spacer 13, thereby forming an annular gap 15. Although the return plate 11 could be another disc magnet which would provide a stronger magnetic field, in the preferred embodiment of the invention the return plate 11 is made of a magnetically permeable material such as soft iron in order to reduce the friction load on the watt-hour meter. It can be seen that this configuration directs the magnetic lines of force parallel to the shaft 7, and that as the shaft is rotated, the polarity of the magnetic field at any given point in the gap 15 reverses for every 90° of shaft rotation. It should be appreciated that the lower portion of the figure has been enlarged for clarity. In a working model of the invention, the disc magnet 9 and the return plate 11 are 0.1 inches and 0.04 inches thick respectively and 0.75 inches in diameter.

Two magnetodiodes, Q1 and Q2 are mounted on a support such as a phenolic resin board 17 so that they are displaced 90° about the shaft 7. It can be appreciated from FIG. 1, that at any given instant, the magnetodiodes Q1 and Q2 are exposed to magnetic fields of opposite polarity and that this polarity reverses as the magnetic assembly is rotated while the magnetodiodes remain stationary.

Figure 2:
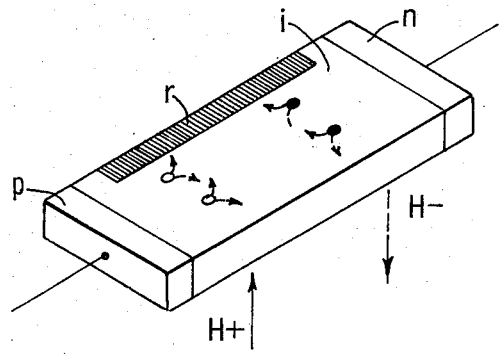
FIG. 2 is a schematic diagram illustrating the operation of a magnetodiode.

FIG. 2 illustrates a magnetodiode which is a magneto sensitive semiconductor device manufactured by the Sony Corporation. The device operates on the principal of controlled lifetime of injected carriers by an external magnetic field. The region $i$ is composed of intrinsic semiconductor material in which the carrier concentration is low but can be appreciably modulated by injection. The p and n regions at opposite ends of the i region contain high concentrations of acceptors and donors respectively for double injection of holes and electrons into the i region. The zone r is formed locally either by mechanical means at the surface or by diffusion of certain impurities into the bulk of the i region so that the recombination of non-equilibrium electrons and holes takes place much more rapidly here than the remainder of the i region.

With no magnetic field applied, the magnetodiode has a current voltage characteristic similar to a conventional semiconductor diode. The magnetosensitivity of the magnetodiode is explained as due to the change in the mean effective lifetime of the injected carriers resulting from their traveling path being deflected by the applied magnetic field. To illustrate, assume that the open circles represent holes and the solid circles represent electrons. It will be assumed that when a magnetic field is applied perpendicular to the plane of the magnetodiode in the direction of the solid arrow labeled H+ that the field will be considered positive and that when the magnetic field is in the direction of the broken arrow labeled H− that it is negative.

It is known that the double injection current which flows in a forward biased long p-i-n structure is an increasing function of the effective lifetime for a given bias voltage. When a magnetic field H+ is applied, the paths of injected electrons and holes are both deflected towards the r zone as illustrated by the solid arrows, where they will more readily combine and cause a sharp decrease of the mean lifetime. This simulates an increase of diode resistance. On the contrary, when a magnetic field H− is applied, the injected carriers are deflected away from the r zone. Therefore, the mean lifetime is prolonged and the current will increase simulating decreased resistance. The magnetodiode exhibits considerable resistance change when exposed to magnetic fields of moderate strength (500 to 1,000 Oersted). Its signal output per KOe change can easily be 10 to 100 times that obtained from Hall generator devices or the magnetoresistors.

By using two magnetodiodes in a bridge circuit, excellent temperature compensation is achieved and by reversing the magnetic field, both negative and positive voltage output signals are obtained thus giving a true three-wire pulse initiator action.

Figure 3:
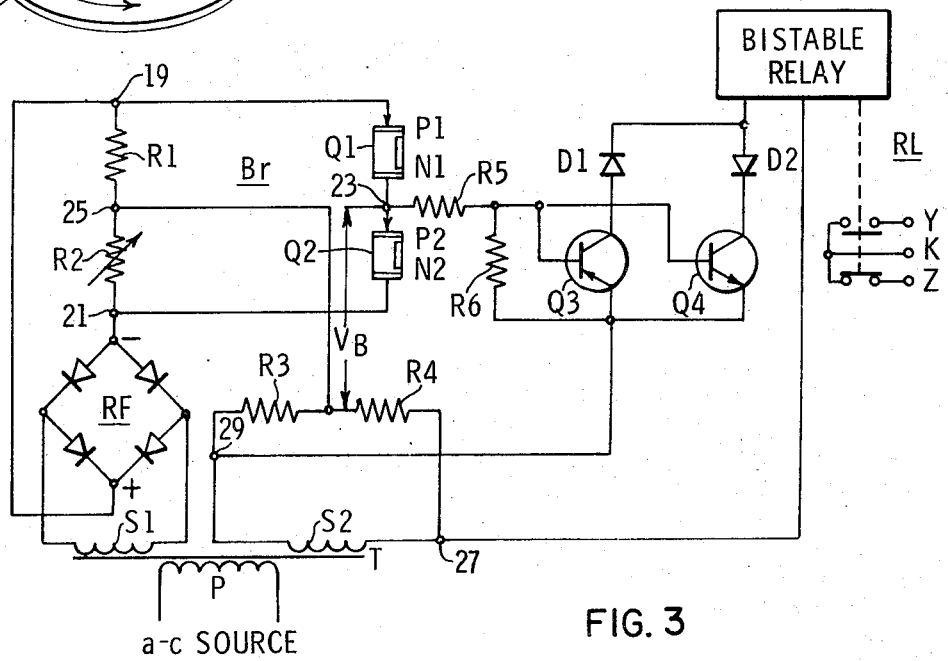
FIG. 3 is a schematic circuit diagram of the exemplary embodiment of the invention.

FIG. 3 illustrates a suitable circuit diagram for a magnetodiode pulse initiator. An alternating current source supplies power to a primary winding P of transformer T which has two secondary windings, S1 and S2. The winding S1 powers a full wave rectifier RF which supplies energization to a bridge circuit BR. Typically the winding S1 supplies five volts RMS to the rectifier which in turn energizes the bridge circuit with an unfiltered full wave DC voltage of 7 peak volts.

The bridge circuit BR is composed of resistor R1 between input 19 and output 25, variable resistor R2 between input 21 add output 25, magnetodiode Q1 with its p region connected to input 19 and its n region connected to output 23 and magnetodiode Q2 with its p region connected to the output 23 and its n region connected to the input 21. Magnetodiodes Q1 and Q2 preferably are selected and matched within approximately 5 percent for resistance at room temperature and ambient earth magnetic field. R1 is typically 850 ohms, and R2 is a 1K ohm trimmer which permits balancing the bridge for $V_B = 0$ with no magnetic field.

When the magnetodiode Q1 is situated in the gap so that it is exposed to a positive magnetic field (when the flux is coming toward the viewer in FIG. 3) the injected holes and electrons in Q1 will be deflected toward the recombination zone thereby raising the effective resistance of Q1. Since as previously mentioned the magnetodiode Q2 will at the same time be exposed to a negative magnetic field, the holes and electrons in magnetodiode Q2 will be deflected away from the recombination zone thereby decreasing the effective resistance of Q2. Under these circumstances the major portion of the voltage drop on the right side of the bridge circuit will be across the magnetodiode Q1. Therefore, the potential of the output terminal 23 of the bridge circuit will be below the potential of output terminal 25 and the voltage VB will be negative.

On the other hand, when the magnetodiode Q1 is exposed to a negative magnetic field while the magnetodiode Q2 is exposed to a positive magnetic field, the major portion of the voltage drop on the right-hand side of the bridge circuit will occur across magnetodiode Q2 and the bridge output voltage VB will be positive.

The voltage VB is applied to the base terminals of the transistors Q3 and Q4 through the current limiting resistor R5, which typically has a value of 200 ohms. A bias resistor R6 having a value on the order of 50K ohms shunts the parallel connected transistors. Transistor Q3 is a pnp transistor while Q4 is an npn transistor.

The emitters of the transistors Q3 and Q4 are connected to one terminal of the secondary winding S2 of transformer T while the collectors of the transistors are connected in parallel through diodes D1 and D2 to one terminal of the translating means which is a bistable relay RL. The other terminal of the relay RL is connected to the second terminal on the winding S2 of transformer T.

The relay RL is a polarized magnetic latching relay of the mercury-wetted contact type. The relay has three output terminals, Y, K and Z. When current is passed through the coil of the relay in one direction the internal circuit between the output terminals Y and K is open while the internal circuit between the terminals K and Z is closed. When current is passed through the coil in the opposite direction, the output conditions are reversed. The relay is a bi-stable device in that once the device is operated to a given condition by current passing through the coil in a given direction it will remain in that condition even though the current is removed until sufficient current is passed through the coil in the opposite direction to operate the device to the other stable condition. This type of device will operate in 2 or 3 milliseconds, therefore, only the peak portion of an appropriate half cycle of current is required to effect a contact transfer.

It can be seen that when the output voltage of the bridge circuit VB is positive, that the transistor Q4 is forward biased and will conduct on those half cycles of the alternating current source when the terminal 27 of the secondary winding S2 is positive with respect to the terminal 29. Similarly, current of the opposite polarity will be gated to the relay RL during half cycles when the terminal 27 is negative with respect to the terminal 29 if the transistor Q3 is forward biased by a negative VB. The parameters of the system are such that the transistors Q3 and Q4 operate in the switching mode when the voltage VB has the appropriate polarity. The diodes D1 and D2 isolate each transistor to its own switching function.

In a preliminary version of the switching circuit, resistors R3 and R4 were not used and the output terminal 25 of the bridge circuit was tied directly to the emitters of Q3 and Q4. It was then necessary to generate sufficient voltage output from the bridge circuit by utilizing strong magnetic fields and a higher imposed voltage to exceed the saturation voltage threshold of the transistors. This was in the neighborhood of 0.5 volt and although easily obtainable would be difficult to maintain under all temperatures and supply voltage conditions. Thus, the addition of an AC bias voltage to the bridge circuit was accomplished by the voltage divider resistors R3 and R4. This augments the output of the bridge circuit by about 0.25 volts RMS, or 0.35 volts peak. The transistors were then switched reliably on signals of the proper polarity and approximately 0.2 volts or higher. Since the AC bias voltage is derived from a secondary winding S2 of the transformer T, it will always be in phase with the voltage applied to the collector-emitter circuits of the transistors Q3 and Q4. Alternately, the AC bias voltage could be supplied by adding a tap to the S2 winding of the transformer T.

In summary, it can be seen that for successive half cycles of the alternating current source a voltage of alternating polarity is applied across the parallel connected transistors Q3 and Q4. Depending upon the polarity of the output voltage of the bridge circuit VB, one of the transistors Q3 or Q4 will be saturated on alternate half cycles of the Ac voltage to supply current of that polarity to the relay RL. The relay RL being a fast acting latching type relay will be operated to the appropriate condition at the peak of the initial half cycle and the subsequent half cycles of current having the same polarity will have no effect on the relay. When the voltage VB changes polarity the other transistor will be saturated on the next appropriate half cycle and the relay RL will switch to its other bistable condition.

The voltage VB will alternate in polarity as the disc magnet assembly is rotated with respect to the stationary magnetodiodes Q1 and Q2. The rate at which the magnetic field is rotated is governed by the rate of power consumption in the circuit being monitored by the watt-hour meter. In any event, the magnetic field will change polarity at a much slower rate than the 60 hertz of the alternating current source. The voltage divider R3 and R4 applies a bias voltage to the bridge circuit which assures positive operation of the switching transistors Q3 and Q4 with a moderate strength magnetic field of 500 to 1,000 Oersted.

It should be appreciated that no filtered DC supply is required to assure the operation of the device thereby eliminating the need for capacitors in the supply circuit. In fact, no capacitors at all are used which should increase the life and reliability of the circuits.

I claim as my invention:

1. A pulse initiator for generating pulses at a rate proportional to the rate of power consumption in an electrical circuit comprising: a watt-hour meter having a movable member which is rotated at a rate dependent upon the rate of electrical power consumption in the electrical circuit; a shaft connected to the movable member for rotation at a rate proportional to the rate of rotation of the movable member; a magnetic field source connected to said shaft for rotation in synchronism therewith; two magnetodiode devices mounted with respect to said magnetic field source so that at any given instant they are oppositely affected by the magnetic field; a bridge circuit having two input terminals, two output terminals and a voltage source, wherein the magnetodiode devices have both a *p* region and an *n* region, wherein the voltage source is connected across the input terminals, wherein the first magnetodiode device is connected between a first input terminal and a first output terminal with the *p* region connected to said first input terminal, and wherein the second magnetodiode device is connected between the second input terminal and the first output terminal with the *n* region connected to said second input terminal, and wherein said bridge circuit generates first and second signals of opposite polarities across said input terminals when said magnetodiode devices are mutually exposed to opposite orientations of said magnet field source; first and second electronic switches each having a control circuit and a power circuit, wherein said control circuits of said electronic switches are connected in parallel across the output terminals of the bridge circuit, and wherein said power circuits are connected in parallel with each other; a bistable translating means operative to a first stable condition in response to a current of a first polarity and operative to a second stable condition in response to a current of the opposite polarity; and an alternating current source connected in series with the bistable translating means and the parallel connected power circuits of the electronic switches, whereby said first electronic switch is operative to gate half cycles of current of said first polarity from the alternating current source to the bistable translating means in response to the generation of said first signal by the bridge circuit and said second electronic switch is operative to gate half cycles of alternating current of the opposite polarity to the bistable device in response to the generation of said second signal by said bridge circuit.

2. The apparatus of claim 1 wherein the magnetic field source is a disk shaped permanet magnet having north and south pole segments oriented such that one of the magnetodiode devices is aligned with a pole segment of a first polarity while the other magnetodiode device is aligned with a pole segment of the opposite polarity.

3. The apparatus of claim 2 including a return plate of magnetically permeable material axially displaced on the shaft from common sides of said magnet and said magnetodiode devices for directing magnet lines of force parallel to said shaft and through said magnetodiode devices.

4. The apparatus of claim 3 wherein the disked shaped permanent magnet has two north and two south pole segments situated 90° apart and wherein said magnetodiode devices are spaced 90° apart around the shaft and between said magnet and said return plate.

5. The apparatus of claim 1 including a bias circuit connected to the control circuits of said electronic switches and operative to apply bias currents of the appropriate polarity to the respective electronic switches to reenforce the first and second signals whereby positive operation of said switches is insured.

6. The apparatus of claim 5 wherein said bias circuit includes means connected to said alternating current source for applying said bias currents to the control circuits of said electronic switches in phase with the alternating current supplied by the alternating current source to the bistable device through the power circuits of said electronic switches.

* * * * *